(12) United States Patent
Chen et al.

(10) Patent No.: US 6,842,557 B2
(45) Date of Patent: Jan. 11, 2005

(54) OPTICAL SWITCH INCORPORATING STEPPED FACETED MIRRORS

(75) Inventors: Datong Chen, Sunnyvale, CA (US); John C. Philipp, Sonoma, CA (US); Ian Hardcastle, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/418,669

(22) Filed: Apr. 18, 2003

(65) Prior Publication Data
US 2003/0210852 A1 Nov. 13, 2003

Related U.S. Application Data

(63) Continuation of application No. 09/755,526, filed on Jan. 5, 2001, now Pat. No. 6,580,849.

(51) Int. Cl.[7] .................................................. G02B 6/26
(52) U.S. Cl. .............................. 385/18; 385/15; 385/16; 385/17; 385/25
(58) Field of Search ............................. 385/15, 16, 17, 385/18, 25

(56) References Cited

U.S. PATENT DOCUMENTS 6,212,309 B1    4/2001  Nguyen et al.
6,253,001 B1    6/2001  Hoen
6,337,760 B1 *  1/2002  Huibers et al. ............. 359/291
6,580,849 B2 *  6/2003  Chen et al. .................... 385/18

* cited by examiner

Primary Examiner—Hung Xuan Dang
Assistant Examiner—Tuyen Tra
(74) Attorney, Agent, or Firm—Ian Hardcastle (57) ABSTRACT

An optical switch that includes optical paths organized into a set of M input optical paths and a set of N output optical paths, where at least one of M and N is greater than unity. The optical switch additionally includes a faceted mirror corresponding to each of the M input optical paths and including N facets and a faceted mirror corresponding to each of the N output optical paths and including M facets. Finally, the optical switch includes a moving mechanism coupled to each faceted mirror to step the faceted mirror linearly in a direction orthogonal to the optical paths to selectively align one of the facets of the faceted mirror with the one of the optical paths with which the faceted mirror is associated. The facets of each of the faceted mirror corresponding to one of the sets of optical paths, i.e., the set of input optical paths or the set of output optical paths, are preferably angled to reflect light towards a different one of the faceted mirrors corresponding to the other of the sets of optical paths, i.e., the set of output optical paths or the set of input optical paths, respectively.

17 Claims, 6 Drawing Sheets

OPTICAL SWITCH INCORPORATING STEPPED FACETED MIRRORS

This application is a Continuation of pending U.S. patent application Ser. No. 09/755,526 filed on 5 Jan. 2001 now U.S. Pat. No. 6,580,849.

FIELD OF THE INVENTION

The invention relates to optical switches and, in particular, to an M×N optical switch in which the optical signals are switched using stepped, faceted mirrors.

BACKGROUND OF THE INVENTION

MEMS-based M×N optical switches are currently being developed for use in optical switching systems, such as the optical switching systems used to switch optical signals from one optical fibre to another in an optical network. In such an optical switch, an optical signal received via an input fibre illuminates a first steerable mirror. The input fibre is one of M input fibres. The first steerable mirror is associated with the input fibre and steers the optical signal towards a second steerable mirror. The second steerable mirror is associated with an output fibre. The output fibre is one of N output fibres. The second steerable mirror reflects the optical signal received from the first steerable mirror into the output fibre.

In such an optical switch, the angle of each of the steerable mirrors must be accurately set to a precision in the order of 1 part in $2^{13}$ to couple the optical signal from the input fibre to the output fibre with a high coupling efficiency. When the input and output fibres are arrayed in two-dimensional arrays, the angle of the steerable mirrors must be set with the required precision about each of two orthogonal axes. Complex, closed-loop positioning mechanisms are required to achieve this accuracy.

SUMMARY OF THE INVENTION

The invention provides an optical switch comprising optical paths organized into a set of M input optical paths and a set of N output optical paths, where at least one of M and N is greater than unity. The optical switch additionally comprises a faceted mirror corresponding to each of the M input optical paths and including N facets and a faceted mirror corresponding to each of the N output optical paths and including M facets. Finally, the optical switch comprises a moving mechanism coupled to each faceted mirror to step the faceted mirror linearly in a direction orthogonal to the optical paths to selectively align one of the facets of the faceted mirror with the one of the optical paths with which the faceted mirror is associated.

The facets of each of the faceted mirrors corresponding to one of the sets of optical paths, i.e., the set of input optical paths or the set of output optical paths, are angled to reflect light towards a different one of the faceted mirrors corresponding to the other of the sets of optical paths, i.e., the set of output optical paths or the set of input optical paths, respectively.

The optical switch according to the invention avoids the need to set the angle of steerable mirrors with great accuracy by replacing each of the steerable mirrors of the conventional MEMS-based optical switch with a stepped, faceted mirror. Each facet of the mirror is fabricated with the required angular precision, but the mirror is simply stepped linearly in one or two directions, to align the appropriate facet of the faceted mirror with the input optical path or the output optical path. The precision with which the mirror needs to be stepped is substantially less than that with which the angles of the steerable mirrors need to be set. This simplifies and reduces the cost of making the optical switch according to the invention. Moreover, the steps with which each of the mirrors is moved can be made equal to one another. This enables a simple electrostatic stepper motor to be used as the moving mechanism, which further simplifies and reduces the cost of the optical switch according to the invention compared with a conventional optical switch.

The invention additionally provides a method for switching an optical signal received via an input optical path to an output optical path. The input optical path is any one of an array of M input optical paths and the output optical path is any one of an array of N output optical paths, where at least one of M and N is greater than unity. In the method, an N-faceted mirror corresponding to each of the M input optical paths end an M-faceted mirror corresponding to each of the N output optical paths are provided. Each N-faceted mirror is located opposite the corresponding one of the input optical paths. Each M-faceted mirror is located opposite the corresponding one of the output optical paths. The N-faceted mirror corresponding to the input optical path is lindarly stepped in a direction orthogonal to the input optical path to align one of the facets of the N-faceted mirror with the input optical path. The facet aligned with the input optical path is angled to reflect the optical signal towards the M-faceted mirror corresponding to the output optical path. The M-faceted mirror corresponding to the output optical path is linearly stepped in a direction orthogonal to the output optical path to align one of the facets of the M-faceted mirror with the output optical path. The facet aligned with the output optical path is angled to reflect light that would be received via the output optical path towards the N-faceted mirror corresponding to the input optical path.

DETAILED DESCRIPTION OF THE INVENTION

Figure 1:
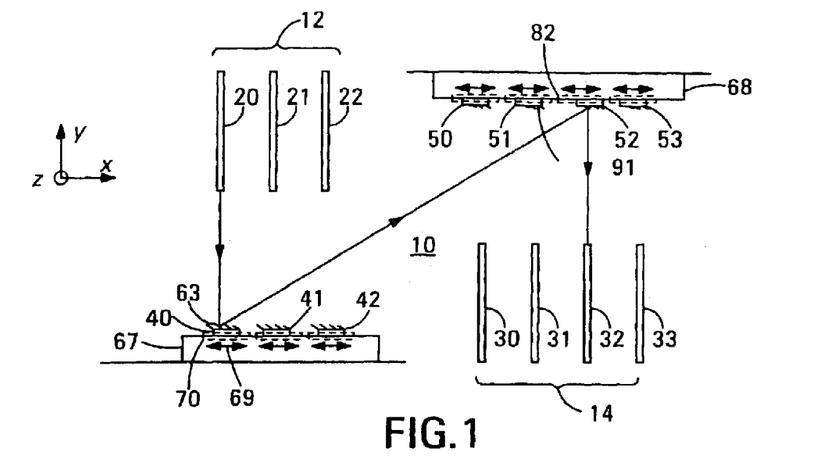
FIG. 1 is a schematic diagram showing a simplified first embodiment of an optical switch according to the invention. The optical switch is shown configured to switch an optical signal from the input optical path 20 to the output optical path 32.

FIG. 1 shows a simplified first embodiment 10 of an optical switch according to the invention. The optical switch is composed of the set 12 of M input optical paths, the set 14 of N output optical paths, a faceted mirror corresponding to each of the M input optical paths and having N facets, a faceted mirror corresponding to each of the N output optical paths and having M facets, and a moving mechanism coupled to each faceted mirror to linearly step the faceted mirror to align one of the facets of the faceted mirror with the optical path to which the faceted mirror corresponds.

In the example shown in FIG. 1, the set 12 of input optical paths is composed of the three input optical fibres 20, 21 and 22 arranged as a one-dimensional array disposed in the x-direction, and the set 14 of output optical paths is composed of the four output fibres 30, 31, 32 and 33 also arranged in a one-dimensional array disposed in the x-direction. The set 13 of output optical paths is located opposite the set 12 of input optical paths in the same plane, and is offset from the set of input optical paths in the x-direction and in the y-direction. Locating the output optical paths and the input optical paths in the same plane simplifies the design of the faceted mirrors, but is not essential to the invention.

Located opposite the light-emitting ends of the input fibres 20, 21 and 22 are the faceted mirrors 40, 41 and 42 respectively. Each of the faceted mirrors is located to receive light from a different one of the input fibres, and is said to correspond to the input fibre. In the example shown, the set 14 of output optical paths is composed of four optical fibres, so the faceted mirrors 40–42 each have four facets.

Located opposite the ends of the output fibres 30, 31, 32 and 33 are the faceted mirrors 50, 51, 52 and 53, respectively. Each of the faceted mirrors is located in a position at which it would receive light from a different one of the output fibres if light were output from the output fibres, and is said to correspond to the output fibre. In the example shown, the set 12 of input optical paths is composed of three optical fibres, so the faceted mirrors 50–53 each have three facets.

The number of facets stated above are minimum numbers. It may be desirable for the faceted mirrors to have more than the minimum number of facets stated above. For example, when the number of input optical paths differs from the number of output optical paths, providing the faceted mirrors corresponding to the larger set of optical paths with the same number of facets as the faceted mirrors corresponding to the smaller set of optical paths allows the same mirror design to be used in corresponding positions with both the output optical paths and the input optical paths. This would also allow the numbers of input optical paths or output optical paths to be increased later, for example. However, facets in excess of the minimum numbers stated above will be unused.

The fibres constituting the set 12 of input optical paths and the set 13 of output optical paths, the faceted mirrors 40–42 and the faceted mirrors 50–53 are mounted on a suitable armature (not shown) that precisely defines their positions relative to one another.

Figure 2A:
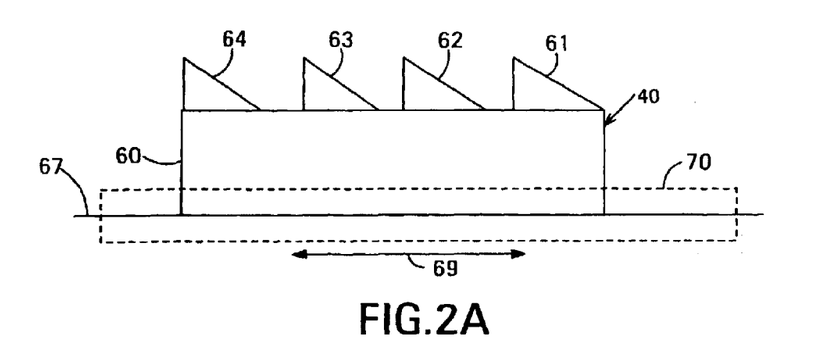
FIG. 2A is an enlarged schematic side view of a first embodiment of an exemplary one of the faceted mirrors of the optical switch shown in FIG. 1.

FIG. 2A is an enlarged view of a first embodiment of the faceted mirror 40 shown in FIG. 1. The faceted mirror is composed of the stage 60 on which are mounted the four mirror facets 61, 62, 63 and 64 arranged in a one-dimensional array disposed in the x-direction. The stage is movably mounted on the stator 67 in a manner that allows the stage to move freely in the x-direction, but which constrains the stage from moving in the y- and z-directions. For example, high aspect ratio bendable flexures (not shown) may extend between the stage and the stator to allow the stage to move freely in the x-direction but to restrain movement of the stage in the y- and z-directions.

The faceted mirrors 41 and 42 are similarly configured to the faceted mirror 40 and are similarly mounted on the stage 67. The faceted mirrors 50–53 are also similarly configured and are similarly mounted on the stator 68.

Disposed between the stage 60 and the stator 67 is the moving mechanism shown schematically at 70. The moving mechanism moves the stage 60, and, hence, the mirror facets 61–64, back and forth in the x-direction, as indicated by the arrows 69. The moving mechanism is preferably a precision linear electrostatic or electromagnetic stepper motor that moves the stage in the x-direction between predetermined positions. At each of the predetermined positions, a different one of the mirror facets 61–64 is aligned with the light output by the input optical path 20. A precision linear electrostatic stepping motor of the type described in U.S. Pat. No. 5,986,381 of Hoen et al. is preferred. The centers of the mirror facets are preferably equally spaced in the x-direction to make the distances between the predetermined positions equal. The electrodes of the Hoen stepping motor can then be fabricated with a pitch that enables the stepping motor to move the stage automatically and precisely to each of the predetermined positions.

Alternatively, the moving mechanism 70 can comprise a rotary motor, preferably a rotary stepper motor, and a suitable transmission that converts rotary motion into linear motion. As further alternatives, piezoelectric actuators or piezoelectric benders or other precision mechanisms that generate linear movement can be used. Such mechanisms can be used with or without feedback control of the position of the stage 60.

The faceted mirrors 41, 42 and 50–53 are each equipped with a moving mechanism similar to the moving mechanism 70.

The mirror facets 61–64 of the faceted mirror 40 are angled differently from one another such that each of them reflects light received from the input fibre 20 towards a different one of the faceted mirrors 50–53 corresponding to the set 14 of output optical paths. In particular, the mirror facets 61, 62, 63 and 64 are angled such that they reflect light received from the input optical path 20 to towards the faceted mirrors 50, 51, 52 and 53, respectively, corresponding to the output fibres 31, 32, 33 and 34, respectively.

The mirror facets of the faceted mirrors 41 and 42 are also angled to meet the conditions as those just described. However, since the positions in the x-direction of the input fibres 21 and 22 corresponding to the faceted mirrors 41 and 42, respectively, differ from one another and from that of the input fibre 20, the angles of the mirror facets of the faceted mirrors 41 and 42 differ from one another and from those of the mirror facets of the faceted mirror 40.

The mirror facets of the faceted mirrors 50–53 corresponding to the set 14 of output optical paths are angled such that, if light were output by the output fibres 30–33, each mirror facet would reflect such light towards on a different one of the faceted mirrors 40–42, respectively, corresponding to the set 12 of input optical paths. When angled to meet the condition just described, each facet of the faceted mirrors 50–53 reflects light received from a different one of the faceted mirrors 40–42 into the output optical path corresponding to the faceted mirror.

FIG. 1 shows an example in which the optical switch 10 is configured to switch an optical signal from the input fibre 20 to the output fibre 32. The moving mechanism 70 linearly steps the faceted mirror 40 in the x-direction to align the facet 63 with the input fibre 20. The facet 63 reflects the optical signal received from the input fibre 20 towards the faceted mirror 52 corresponding to the output fibre 32 in the set 14 of output optical paths.

The moving mechanism 82 coupled to the faceted mirror 52 linearly steps the moving mirror in the x-direction to align the facet 91 with the output fibre 32. The optical signal received via the input fibre 20 and reflected by the faceted mirror 40 is incident on the facet 91 of the faceted mirror 52. The facet 91 is angled such that it reflects the optical signal into the output optical path 32.

Figure 3A:
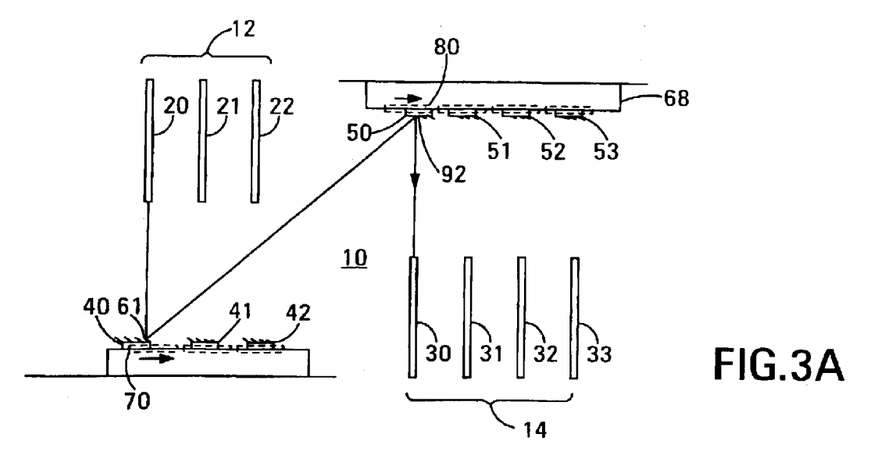
FIG. 3A is a schematic diagram showing the simplified embodiment of the optical switch shown in FIG. 1 reconfigured to switch an optical signal from the input optical path 20 to the output optical path 30.

FIG. 3A shows an example in which the optical switch 10 is reconfigured to switch the optical signal from the input fibre 20 to the output fibre 30. The moving mechanism 70 has linearly stepped the faceted mirror 40 in the x-direction to align the facet 61 with the input fibre 20. The moving mechanism 80 has linearly stepped the faceted mirror 50, which corresponds to the output fibre 30, in the x-direction to align the facet 92 with the output fibre 30.

The facet 61 of the faceted mirror 40 reflects the optical signal output by the input fibre 20 towards the faceted mirror 50. At the faceted mirror 50, the optical signal is incident on the facet 92, which is angled to reflect the optical signal into the output fibre 30.

Figure 3B:
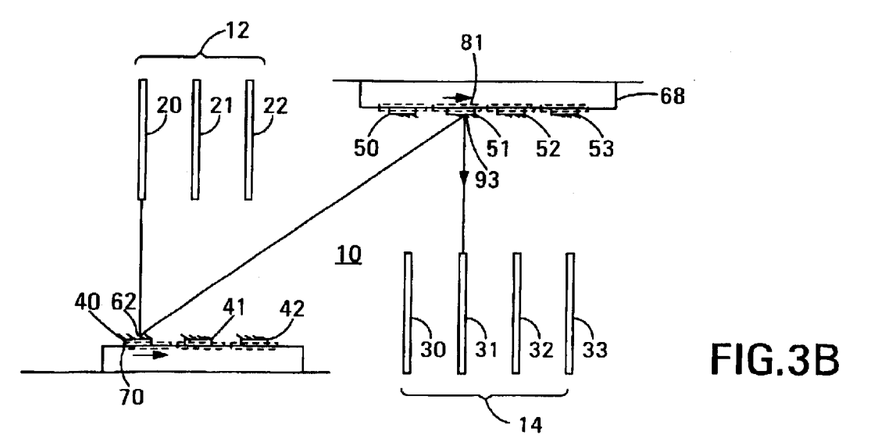
FIG. 3B is a schematic diagram showing the simplified embodiment of the optical switch shown in FIG. 1 reconfigured to switch an optical signal from the input optical path 20 to the output optical path 31.

FIG. 3B shows an example in which the optical switch 10 is reconfigured to switch the optical signal from the input fibre 20 to the output fibre 31. The moving mechanism 70 has linearly stepped the faceted mirror 40 in the x-direction to align the facet 62 with the input fibre 20. The moving mechanism 81 has linearly stepped the faceted mirror 51, which corresponds to the output fibre 31, in the x-direction to align the facet 93 with the output fibre 31.

The facet 62 of the faceted mirror 40 reflects the optical signal output by the input fibre 20 towards the faceted mirror 51. At the faceted mirror 51, the optical signal is incident on the facet 93, which is angled to reflect the optical signal into the output fibre 31.

Figure 3C:
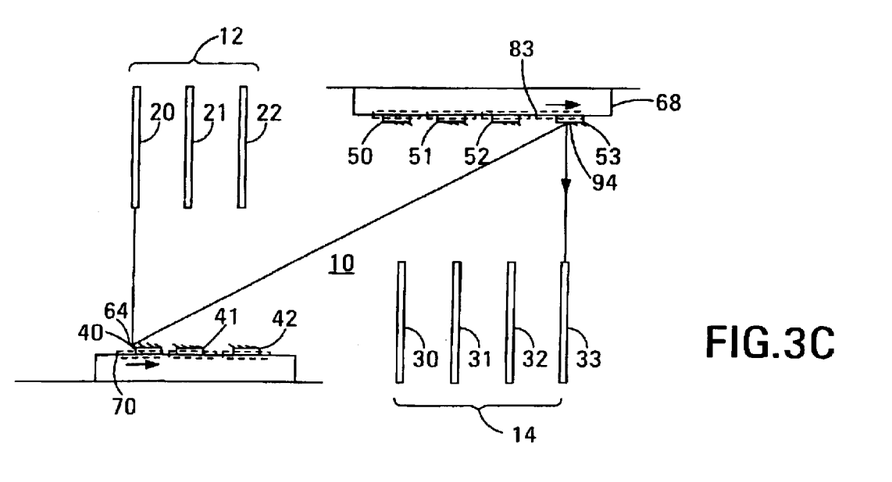
FIG. 3C is a schematic diagram showing the simplified embodiment of the optical switch shown in FIG. 1 reconfigured to switch an optical signal from the input optical path 20 to the output optical path 33.

FIG. 3C shows an example in which the optical switch 10 is reconfigured to switch the optical signal from the input fibre 20 to the output fibre 33. The moving mechanism 70 has linearly stepped the faceted mirror 40 in the x-direction to align the facet 64 of the faceted mirror 40 with the input fibre 20. The moving mechanism 83 has linearly stepped the faceted mirror 53, which corresponds to the output fibre 33, in the x-direction to align the facet 94 with the output fibre 33.

The facet 64 of the faceted mirror 40 reflects the optical signal output by the input fibre 20 towards the faceted mirror 53. At the faceted mirror 53, the optical signal is incident on the facet 94, which is angled to reflect the optical signal into the output fibre 33.

Figure 4A:
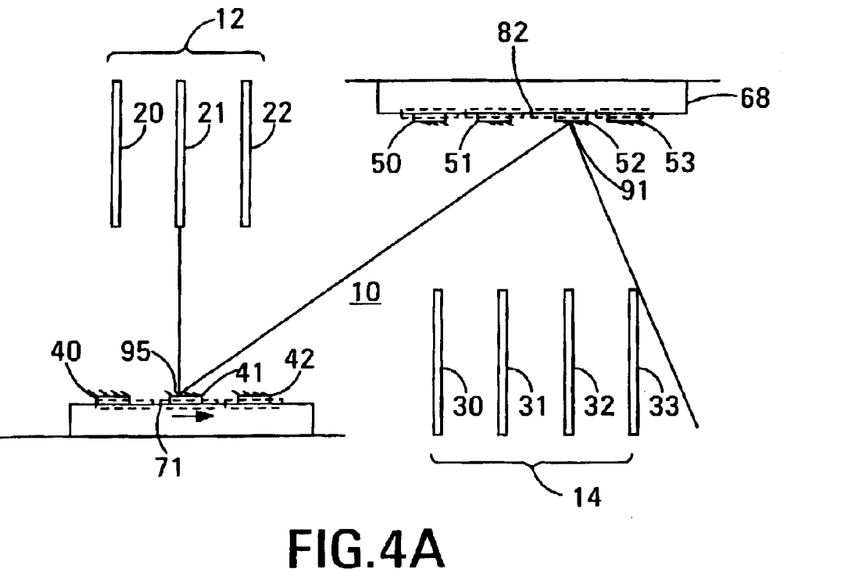
FIG. 4A is a schematic diagram showing the simplified embodiment of the optical switch according to the invention partially reconfigured to switch an optical signal from the input optical path 21 to the output optical path 32.

FIG. 4A shows an example in which the optical switch 10 is part-way through being configured from the state shown in FIG. 1 to switch an optical signal from the input fibre 21 to the output fibre 32. The moving mechanism 71 of the faceted mirror 41, corresponding to the input fibre 21, has linearly stepped the faceted mirror 41 in the x-direction to align the facet 95 with the input fibre 21. The facet 95 reflects the optical signal received via the input fibre 21 towards the faceted mirror 52 that corresponds to the output fibre 32. However, the optical signal is incident on the facet 91 of the faceted mirror 52 at a different angle of incidence from that of the optical signal shown in FIG. 1 as being received via the input fibre 20. Thus, the facet 91 reflects the optical signal received via the input fibre 21 with an angle of reflection that results in the optical signal missing the output fibre 32.

Figure 4B:
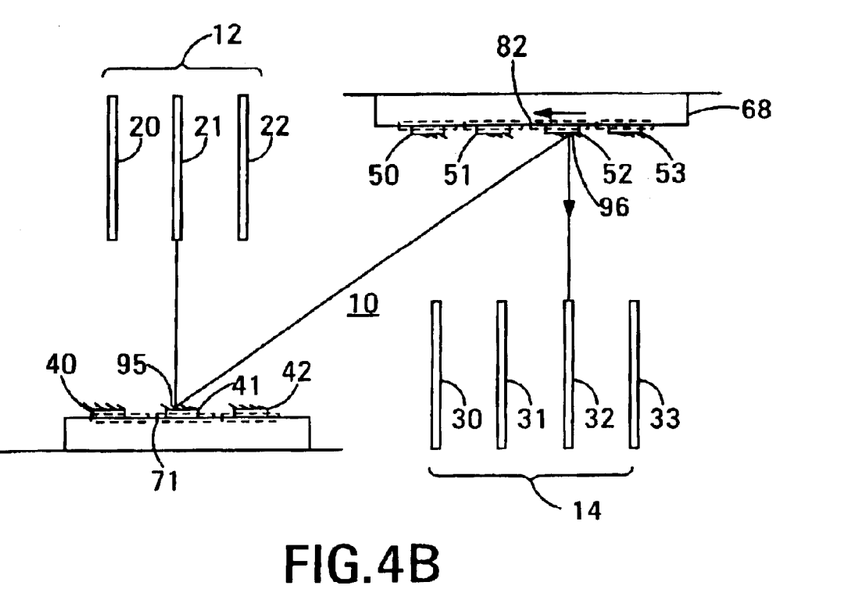
FIG. 4B is a schematic diagram showing the simplified embodiment of the optical switch according to the invention fully reconfigured to switch the optical signal from the input optical path 21 to the output optical path 32.

FIG. 4B shows the optical switch 10 fully reconfigured to switch the optical signal from the input fibre 21 to the output fibre 32. The moving mechanism 82 has linearly stepped the faceted mirror 52 in the x-direction to align the facet 96 with the output optical path 32. The facet 96 is angled to reflect the optical signal received from the facet 95 of the faceted mirror 41 into the output fibre 32.

It will be apparent to a person of ordinary skill in the art that the optical switch 10 may be reconfigured by laterally stepping various ones of the faceted mirrors 40–42 and 50–53 to switch an optical signal received via any one of the M input fibres to any one of the N output fibres in a manner similar to the switching operations exemplified in FIGS. 3A–3C, 4A and 4B. It will also be apparent to the person of ordinary skill in the art that the simplified embodiments shown in this disclosure can easily be extended to operates with larger arrays of input fibres and output fibres and correspondingly larger arrays of faceted mirrors, each faceted mirror having a correspondingly larger number of facets.

Figure 5:
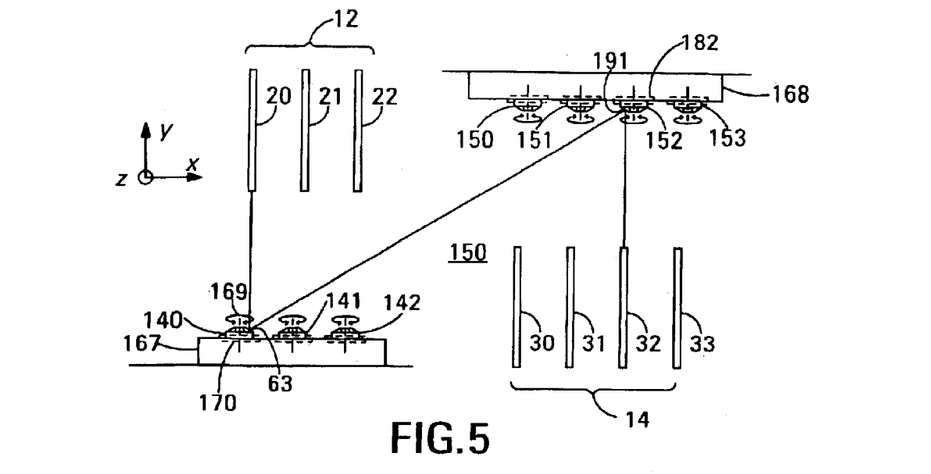
FIG. 5 is a schematic diagram showing a simplified second embodiment of an optical switch according to the invention.

FIG. 5 shows a simplified second embodiment 150 of an optical switch according to the invention. Elements of the embodiment 150 that correspond to elements of the embodiment 10 shown in FIG. 1 are indicated by the same reference numerals and will not be described again here. The optical switch is composed of the set 12 of M input optical paths, the set 14 of N output optical paths, a faceted mirror corresponding to each of the M input optical paths and having N facets, a faceted mirror corresponding to each of the N output optical paths and having M facets, and a moving mechanism coupled to each faceted mirror to rotationally step the faceted mirror to align one of the facets of the faceted mirror with the optical path to which the faceted mirror corresponds.

Located opposite the light-emitting ends of the input fibres 20, 21 and 22 are the faceted mirrors 140, 141 and 142 respectively. Each of the faceted mirrors is located to receive light from a different one of the input fibres, and is said to correspond to the input fibre. In the example shown, the set 14 of output optical paths is composed of four optical fibres, so the faceted mirrors 140–142 each have four facets.

Located opposite the ends of the output fibres 30, 31, 32 and 33 are the faceted mirrors 150, 151, 152 and 153, respectively. Each of the faceted mirrors is located in a position at which it would receive light from a different one of the output fibres if light were fed into the output fibres, and is said to correspond to the output fibre. In the example shown, the set 12 of input optical paths is composed of three optical fibres, so the faceted mirrors 150–153 each have three facets.

The number of facets stated above are minimum numbers, as noted above.

Figure 6A:
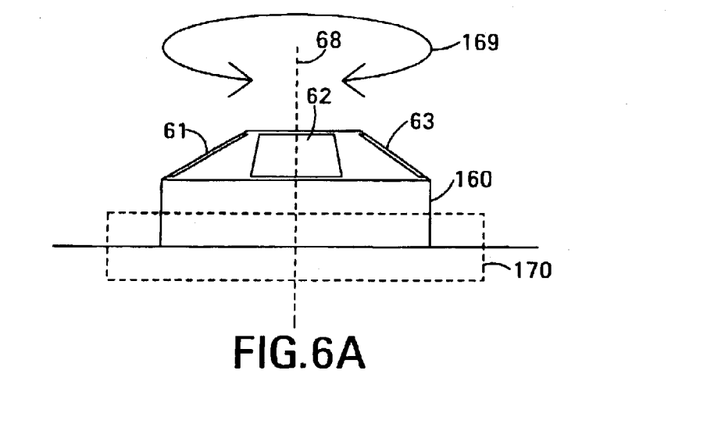
FIGS. 6A and 6B are enlarged schematic elevation and plan views of an embodiment of an exemplary one of the faceted mirrors of the optical switch shown in FIG. 5.
Figure 6B:
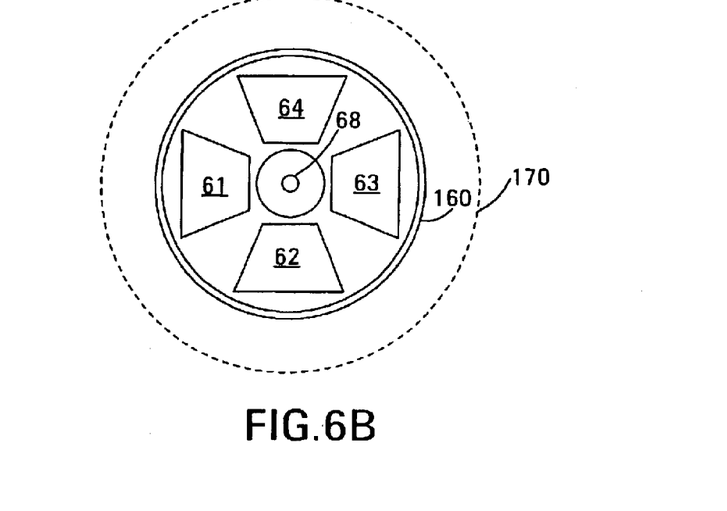

FIGS. 6A and 6B are enlarged elevation and plan views of an embodiment of the faceted mirror 140 of the optical switch 150 shown in FIG. 5. The faceted mirror is composed of the stage 160 on which are mounted the four mirror facets 61, 62, 63 and 64. The stage is rotationally mounted on the pivot 68 affixed to the stator 67 in a manner that allows the stage to rotate freely between predetermined angular positions, but which constrains lateral movement of the stage. The faceted mirrors 141 and 142 are similarly configured and are similarly mounted on the stator 67. The faceted mirrors 150–153 are similarly configured and are similarly pivotally mounted on the stator 168.

Disposed between the stage 60 and the stator 67 is the moving mechanism shown schematically at 170. The moving mechanism moves the stage 60, and, hence, the mirror facets 61–64, rotationally about the pivot 68, as indicated by the arrows 169. The moving mechanism is preferably a precision rotary electrostatic or electromagnetic stepper motor that rotates the stage about the pivot between predetermined rotational positions. At each of the predetermined rotational positions, a different one of the mirror facets 61–64 is aligned with the light output by the input optical path 20. A precision rotary electrostatic stepping motor of the type described in U.S. Pat. No. 5,986,381 of Hoen et al. is preferred. The centers of the mirror facets are preferably spaced at equal angles about the pivot to make the angles between the predetermined rotational positions equal. The electrodes of the Hoen rotary stepping motor can then be fabricated with a pitch that enables the stepping motor to move the stage automatically and precisely to each of the predetermined rotational positions.

Alternatively, the moving mechanism 170 can comprise an electromagnetic rotary motor, preferably a rotary stepper motor. As further alternatives, piezoelectric actuators or piezoelectric benders, and a suitable transmission that converts linear motion into rotary motion or other precision mechanisms that generate rotary movement can be used. Such mechanisms can be used with or without feedback control of the rotational position of the stage 160. Such mechanisms can be used with or without a mechanical detent that defines the predetermined rotational positions.

The faceted mirrors 41, 42 and 50–53 are each equipped with a rotational moving mechanism similar to the moving mechanism 170.

The facets of each of the faceted mirrors corresponding to one of the sets of the optical paths are angled to reflect light towards a different one of the faceted mirrors corresponding to the other of the sets of the optical paths, as described above.

FIG. 5 shows an example in which the optical switch 150 is configured to switch an optical signal from the input fibre 20 to the output fibre 32. The moving mechanism 170 rotationally steps the faceted mirror 140 about the pivot 68 to align the facet 63 with the input fibre 20. The facet 63 reflects the optical signal received from the input fibre 20 towards the faceted mirror 152 corresponding to the output fibre 32 in the set 14 of output optical paths.

The moving mechanism 182 coupled to the faceted mirror 152 rotationally steps the moving mirror about its pivot to align the facet 191 with the output fibre 32. The optical signal received via the input fibre 20 and reflected by the faceted mirror 140 is incident on the facet 191 of the faceted mirror 152. The facet 191 is angled such that it reflects the optical signal into the output optical path 32.

It will be apparent to a person of ordinary skill in the art that the optical switch 150 may be reconfigured by rotating the appropriate ones of the faceted mirrors 140–142 and 150–153 to switch an optical signal received via any one of the M input fibres to any one of the N output fibres in a manner similar to the switching operations exemplified in FIGS. 3A–3C, 4A and 4B. It will also be apparent to the person of ordinary skill in the art that the simplified embodiments shown in this disclosure can easily be extended to operates with larger arrays of input fibres and output fibres and correspondingly larger arrays of rotating faceted mirrors, each faceted mirror having a correspondingly larger number of facets.

Figure 7:
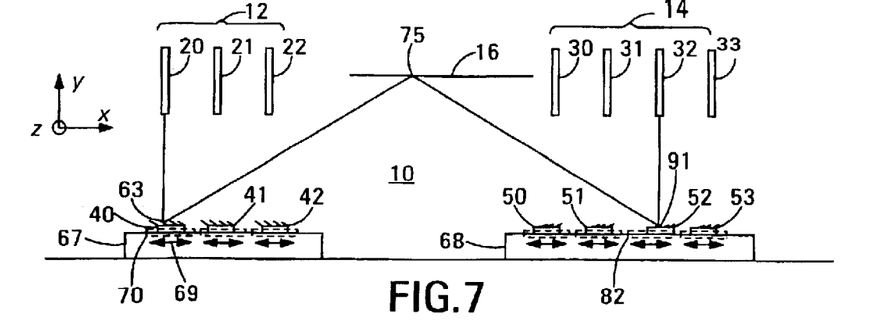
FIG. 7 is a schematic diagram showing a simplified third embodiment of an optical switch according to the invention. The optical switch is shown configured to switch an optical signal from the input optical path 20 to the output optical path 32.

In the embodiments of the optical switch according to the invention shown in FIGS. 1 and 5, the set 13 of output optical paths is mounted opposite the set 12 of input optical paths, and is offset from the set of input optical paths in the x-direction and in the y-direction. The faceted mirrors 40–42 or 140–142 are mounted opposite the set 12 of input optical paths and offset from the set of input optical paths in the −y-direction. The faceted mirrors 50–52 or 150–152 are mounted opposite the set 13 of output optical paths and offset from the set of output optical paths in the y-direction In some applications, it may be more convenient for the input optical paths and the output optical paths to be located in a common plane, and for the faceted mirrors 40–42 or 140–142 and the faceted mirrors 50–52 or 150–152 to be located in and mounted on a common plane. FIG. 7 shows a third embodiment 200 of the optical switch according to the invention in which the elements of the optical switch 10 shown in FIG. 1 have been rearranged to place the set 13 of input optical paths in the same plane as the set 12 of input optical paths and offset from the set of input optical paths in the y-direction, and to offset the faceted mirrors from the optical paths in the −y-direction with the faceted mirrors 50–53 offset from the faceted mirrors 40–42 in the x-direction. The embodiment shown in FIG. 5 may be similarly rearranged. Elements of the embodiment shown in FIG. 7 that correspond to elements of the embodiment shown in FIG. 1 are indicated by the same reference numerals and will not be described again here.

The optical switch 200 additionally includes the common mirror 16 located between the set 12 of input optical paths and the set 13 of output optical paths and facing the plane in which the faceted mirrors are located.

FIG. 7 shows an example in which the optical switch 200 is configured to switch an optical signal from the input fibre 20 to the output fibre 32. The moving mechanism 70 linearly steps the faceted mirror 40 in the x-direction to align the facet 63 with the input fibre 20. The facet 63 reflects the optical signal received from the input fibre 20 towards the point 75 on the common mirror 16. The optical signal is incident on point 75 of the common mirror at an angle of incidence at which the common mirror reflects the optical signal towards the faceted mirror 52 corresponding to the output fibre 32 in the set 14 of output optical paths.

The moving mechanism 82 coupled to the faceted mirror 52 linearly steps the moving mirror in the x-direction to align the facet 91 with the output fibre 32. The optical signal received via the input fibre 20 and reflected by the faceted mirror 40 and point 72 of the common mirror 16 is incident on the facet 91 of the faceted mirror 52. The facet 91 is angled such that it reflects the optical signal into the output optical path 32.

Figure 8A:
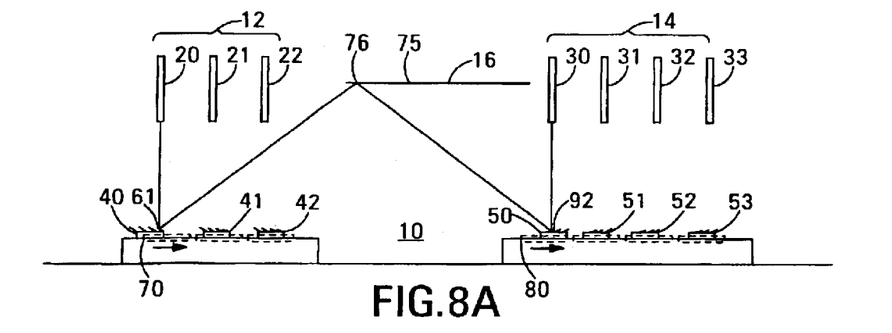
FIG. 8A is a schematic diagram showing the simplified embodiment of the optical switch shown in FIG. 7 reconfigured to switch an optical signal from the input optical path 20 to the output optical path 30.

FIG. 8A shows an example in which the optical switch 200 is reconfigured to switch the optical signal from the input fibre 20 to the output fibre 30. The moving mechanism 70 has linearly stepped the faceted mirror 40 in the x-direction to align the facet 61 with the input fibre 20. The moving mechanism 80 has linearly stepped the faceted mirror 50, which corresponds to the output fibre 30, in the x-direction to align the facet 92 with the output fibre 30.

The facet 61 of the faceted mirror 40 reflects the optical signal output by the input fibre 20 towards the point 76 on the common mirror 16. The optical signal is incident on the point 76 of the common mirror at an angle of incidence at which the common mirror reflects the optical signal towards the faceted mirror 50. At the faceted mirror 50, the optical signal reflected by the common mirror is incident on the facet 92, which is angled to reflect the optical signal into the output fibre 30.

Figure 8B:
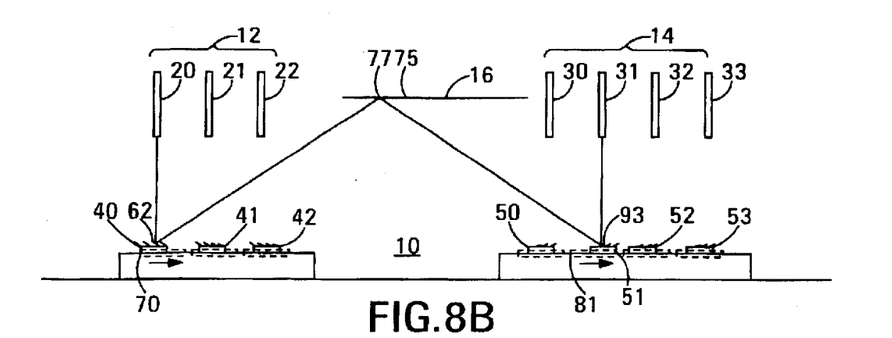
FIG. 8B is a schematic diagram showing the simplified embodiment of the optical switch shown in FIG. 7 reconfigured to switch an optical signal from the input optical path 20 to the output optical path 31.

FIG. 8B shows an example in which the optical switch 200 is reconfigured to switch the optical signal from the input fibre 20 to the output fibre 31. The moving mechanism 70 has linearly stepped the faceted mirror 40 in the x-direction to align the facet 62 with the input fibre 20. The moving mechanism 81 has linearly stepped the faceted mirror 51, which corresponds to the output fibre 31, in the x-direction to align the facet 93 with the output fibre 31.

The facet 62 of the faceted mirror 40 reflects the optical signal output by the input fibre 20 towards the point 77 on the common mirror 16. The optical signal is incident on the point 77 at an angle of incidence at which the common mirror reflects the optical signal towards the faceted mirror 51. At the faceted mirror 51, the optical signal reflected by the common mirror is incident on the facet 93, which is angled to reflect the optical signal into the output fibre 31.

Figure 8C:
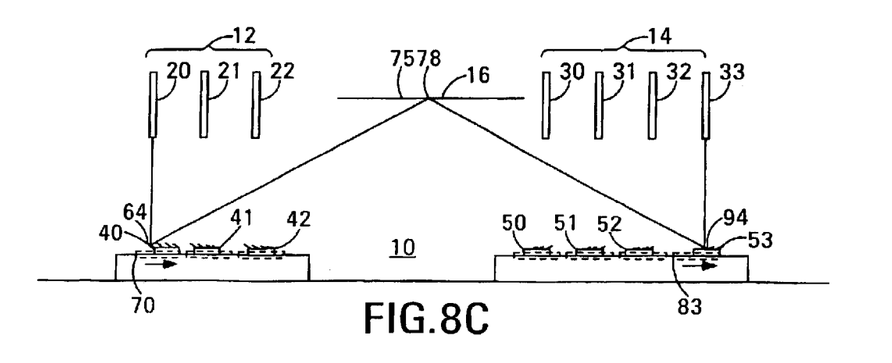
FIG. 8C is a schematic diagram showing the simplified embodiment of the optical switch shown in FIG. 7 reconfigured to switch an optical signal from the input optical path 20 to the output optical path 33.

FIG. 8C shows an example in which the optical switch 200 is reconfigured to switch the optical signal from the input fibre 20 to the output fibre 33. The moving mechanism 70 has linearly stepped the faceted mirror 40 in the x-direction to align the facet 64 of the faceted mirror 40 with the input fibre 20. The moving mechanism 83 has linearly stepped the faceted mirror 53, which corresponds to the output fibre 33, in the x-direction to align the facet 94 with the output fibre 33.

The facet 64 of the faceted mirror 40 reflects the optical signal output by the input fibre 20 towards the point 78 on the common mirror 16. The optical signal is incident on the point 78 of the common mirror at an angle of incidence at which the common mirror reflects the optical signal towards the is faceted mirror 53. At the faceted mirror 53, the optical signal reflected by the common mirror is incident on the facet 94, which is angled to reflect the optical signal into the output fibre 33.

The method 100 according to the invention for switching an optical signal received via an input optical path to an output optical path will now be described with reference to FIG. 9. The input optical path is any one of an array of M input optical paths. The output optical path is any one of an array of N output optical paths.

In process 102, an N-faceted mirror corresponding to each of the M input optical paths is provided.

In process 104, an M-faceted mirror corresponding to each of the N output optical paths is provided.

In process 106, each N-faceted mirror is located opposite the one of the input optical paths to which it corresponds;

In process 108, each M-faceted mirror is located opposite the one of the output optical paths to which it corresponds.

In process 110, the N-faceted mirror located opposite the input optical path is stepped to align one of its facets with the input optical path. The facet that is aligned with the input optical path is angled to reflect the optical signal towards the M-faceted mirror located opposite the output optical path.

Finally, in process 112, the M-faceted mirror located opposite the output optical path is stepped to align one of its facets with the output optical path. The facet that is aligned with the output optical path is angled to reflect light that would be received via the output optical path towards the N-faceted mirror located opposite the input optical path.

The method may additionally use the process described above with reference to FIG. 3A, for example, to change the output optical path to which the optical signal received via the input optical path is switched. The output optical path is changed from the output optical path referred to in FIG. 9, which will be called a first output optical path, to a second output optical path. The second output optical path is one of the output optical paths different from the first output optical path.

Figure 9:
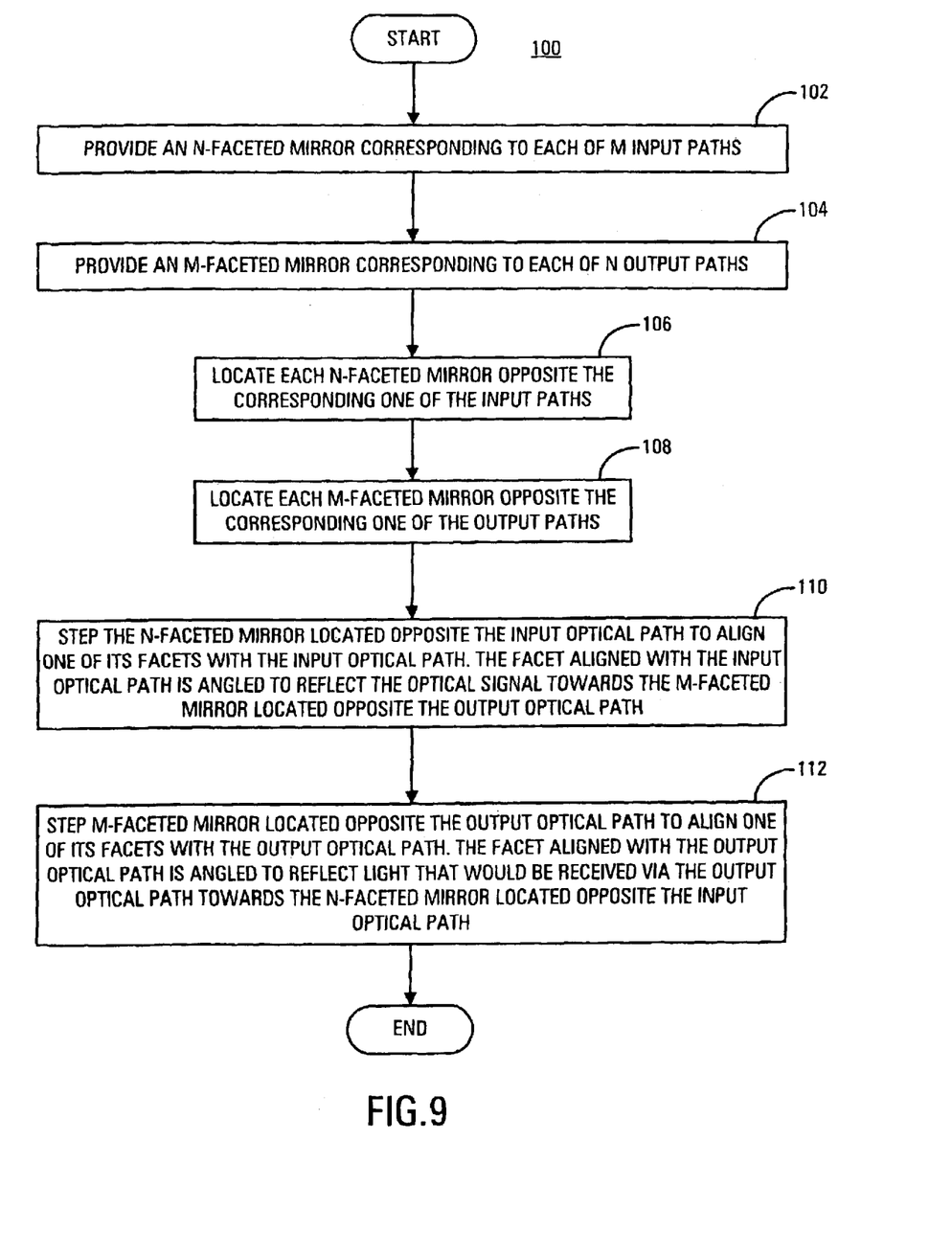
FIG. 9 is a flow diagram illustrating the method according to the invention for switching an optical signal.

The method may additionally use the process described above with reference to FIGS. 4A and 4B, for example, to change the input optical path via which the optical signal is received from the input optical path referred to in FIG. 9, which will be called a first input optical path, to a second input optical path. The second input optical path is one of the input optical paths different from the first input optical path.

The invention has been described with reference to an example in which the 12 set of input optical paths and the set 14 of output optical paths are each composed of optical paths arranged in a one-dimensional array disposed in the x-direction. However, the optical paths in either or both of the set of input optical paths and the set of output optical paths may be arrayed in a one-dimensional array disposed in a direction different from the x-direction, e.g., the z-direction. When the optical paths are arranged in a one-dimensional array disposed in the x-direction, the facets of the faceted mirrors are angled about the z-axis. When the optical paths are arranged in a one-dimensional array disposed in the z-direction, the facets of the faceted mirrors are angled about the x-axis. Regardless of the arrangement of the optical paths, the faceted mirror corresponding to each optical path is located opposite the optical path, as shown in FIGS. 1, 5 and 7.

As a further alternative, the optical paths in either or both of the set 12 of input optical paths and the set 14 of output optical paths may be arranged in a two-dimensional array. When the optical paths are arranged in a two-dimensional array, the faceted mirrors are also arranged in a two-dimensional array the faceted mirror corresponding to each optical path located opposite each optical path, as shown in FIGS. 1, 5 and 7. When the optical paths are arranged in a two-dimensional array, the facets of the faceted mirrors are angled about two axes. For example, the optical paths may be arranged in a two-dimensional array having rows parallel to the x-axis and columns parallel to the z-axis, with the facets of the faceted mirrors angled about the z-axis and the x-axis.

Figure 2B:
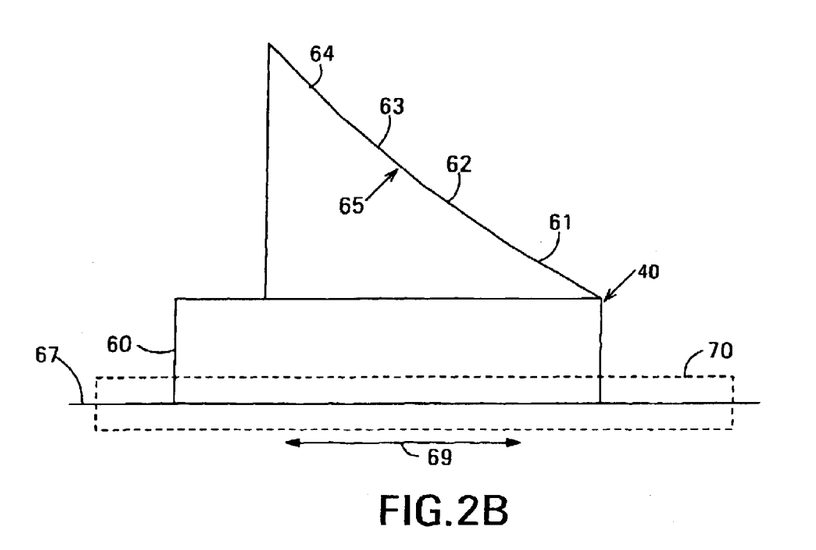
FIG. 2B is an enlarged schematic side view of a second embodiment of an exemplary one of the faceted mirrors of the optical switch shown in FIG. 1.

The invention has also been described with reference to an example in which the faceted mirrors each comprise more than one reflective surface arrayed in the x-direction, as shown in FIG. 2A. Each of the reflective surfaces provides one of the facets 61–64 of the faceted mirror 40. The faceted mirrors may alternatively be configured as shown in FIG. 2B. In this, the faceted mirror 40 comprises the single reflective surface 65 shaped to provide the facets 61–64 arranged in a one-dimensional array in the x-y plane.

The invention has been described with reference to an example in which the facets of the faceted mirrors, such as the faceted mirror 40, are arranged in a one-dimensional array arrayed in the x-direction. However, the facets of the faceted mirrors may alternatively be arrayed in the x-z plane in a direction different from the x-direction. For example, the facets may be arrayed in the z-direction. In this case, the moving mechanism 70 preferably moves the faceted mirror in a direction parallel to that in which the facets are arrayed. For example, when the facets are arrayed in the z-direction, the moving mechanism moves the faceted mirror in the z-direction.

As a further alternative, the facets of the faceted mirrors may be arranged in a two-dimensional array. For example, the facets may be arranged in a two-dimensional array having rows parallel to the x-direction and columns parallel to the z-direction. Specifically, the single reflective surface 65 shown in FIG. 2B may be shaped to provide facets arranged in a two-dimensional array that additionally extends in the z-direction. As another example, a two-dimensional array of facets may be obtained by extending of the reflective surfaces shown at 61–64 in FIG. 2A in the z-direction and dividing each of the reflective surfaces into a one-dimensional array of facets disposed in the z-direction.

In embodiments in which the facets of the faceted mirrors are arranged in a two-dimensional array, the moving mechanism 70 steps the stage 60 in two directions instead of the single direction shown in FIGS. 1 and 7. When the facets are arranged in a two-dimensional array having rows parallel to the x-direction and columns parallel to the z-direction, the moving mechanism steps the stage in the z-direction in addition to the x-direction shown.

The invention has been described with reference to an example in which the facets, such as the facets 61–64, of the faceted mirrors have flat surfaces. However, the facets can additionally be shaped to focus the light reflected by the facet to optimize the coupling efficiency between the input optical path and the output optical path. Since the optical path length between the input optical path and the output optical path that includes each facet differs, each facet is preferably individually shaped to focus the light reflected by the facet optimally for the length of the optical path in which the facet is located.

The precision of the angles of the facets of the faceted mirrors determines the efficiency of the coupling between the input optical path and the output optical path. The angle of each facet of each faceted mirror is determined once, when the optical switch is designed, and does not change during operation of the optical switch 10. Thus, the coupling efficiency of the optical switch is largely determined by the accuracy with which the faceted mirrors are designed and manufactured. The design process generates suitable tooling that is then used to mass-produce the faceted mirrors at low cost and high repeatability. The faceted mirrors, or components of them, may be manufactured using mature and well-controlled manufacturing processes. For example, the faceted mirrors, or components of them, may be manufactured from single-crystal silicon by a micromachining process, or from a suitable plastic material by molding. Similar processes can be used to make the moving mechanism of each faceted mirror.

Also affecting the coupling efficiency is the accuracy with which the facet of the faceted mirror is aligned with the input optical path or the output optical path. The moving mechanism is required to step the faceted mirror linearly in one or two directions, or rotationally, with a precision that ensures that only the facet that effects the desired coupling is aligned with the input optical path or the output optical path. The precision required of the moving mechanism is several orders of magnitude less than that with which the angle of each mirror must be dynamically adjusted in at least one dimension in the conventional MEMS-based optical switch. The angles of the faceted mirrors of the optical switch according to the invention are pre-determined at the design stage and provide low-loss switching with easy mechanical control and long-term stability.

Although this disclosure describes illustrative embodiments of the invention in detail, it is to be understood that the invention is not limited to the precise embodiments described, and that various modifications may be practiced within the scope of the invention defined by the appended claims.

We claim:

1. An optical switch, comprising:
    optical paths organized into a set of M input optical paths and a set of N output optical paths, where at least one of M and N is greater than unity;
    a faceted mirror corresponding to each one of the M input optical paths, the faceted mirror including N facets;
    a faceted mirror corresponding to each one of the N output optical paths, the faceted mirror including M facets; and
    a moving mechanism coupled to each faceted mirror to step the faceted mirror linearly in a direction orthogonal to the optical paths to selectively align one of the facets of the faceted mirror with the one of the optical paths to which the faceted mirror corresponds.

2. The optical switch of claim 1, in which the facets of each of the faceted mirrors corresponding to one of the sets of the optical paths are angled to reflect light towards a different one of the faceted mirrors corresponding to the other of the sets of the optical paths.

3. The optical switch of claim 1, in which:
    in one of the sets of the optical paths, the optical paths are arranged in a one-dimensional array; and
    the facets of the faceted mirror corresponding to each one of the optical paths in the one of the sets are angled about one axis.

4. The optical switch of claim 1, in which:
    in one of the sets of the optical paths, the optical paths are arranged in a two-dimensional array; and
    the facets of the faceted mirror corresponding to each one of the optical paths is the one of the sets are angled about two axes.

5. The optical switch of claim 4, in which the axes are orthogonal to one another.

6. The optical switch of claim 1, in which:
    the facets of the faceted mirror are arranged in a one-dimensional array having an array direction; and
    the moving mechanism moves the faceted mirror in a direction parallel to the array direction.

7. The optical switch of claim 6, in which the moving mechanism includes a linear electrostatic stepping motor.

8. The optical switch of claim 1, in which:
    the facets of the faceted mirror are arrayed in a two-dimensional array having two array directions; and
    the moving mechanism moves the faceted mirror in two directions, each parallel to a different one of the array directions.

9. The optical switch of claim 8, in which the moving mechanism includes a two-dimensional linear electrostatic stepping motor.

10. The optical switch of claim 1, in which the facets of the faceted mirror are curved to focus light reflected by the facets.

11. The optical switch of claim 10, in which:
light passes from one of the input optical paths to one of the output optical paths via an optical path that includes one of the facets of the faceted mirror and whose optical path length depends on the identity of the one of the input optical paths and identity of the one of the output optical paths; and
the one of the facets is individually curved to focus the light in the optical path in accordance with the optical path length thereof.

12. The optical switch of claim 1, in which:
the optical switch additionally comprises a common mirror located between the input optical paths and the output optical paths and facing the faceted mirrors; and
the facets of each of the faceted mirrors corresponding to one of the sets of the optical paths are angled to reflect light to be incident on the common mirror at angles of incidence at which the common mirror reflects the light towards a different one of the faceted mirrors corresponding to the other of the sets of the optical paths.

13. A method for switching an optical signal received via an input optical path to an output optical path, the input optical path being any one of an array of M input optical paths, the output optical path being any one of an array of N output optical paths, where at least one of M and N is greater than unity, the method comprising:
providing an N-faceted mirror corresponding to each one of the M input optical paths and an M-faceted mirror corresponding to each one of the N output optical paths;
locating each N-faceted mirror opposite the corresponding one of the input optical paths;
locating each M-faceted mirror opposite the corresponding one of the output optical paths;
linearly stepping the N-faceted mirror corresponding to the input optical path in a direction orthogonal to the input optical path to align one of the facets of the N-faceted mirror with the input optical path, the one of the facets aligned with the input optical path being angled to reflect the optical signal towards the M-faceted mirror corresponding to the output optical path; and
linearly stepping the M-faceted mirror corresponding to the output optical path in a direction orthogonal to the output optical path to align one of the facets of the M-faceted mirror with the output optical path, the one of the facets aligned with the output path being angled to reflect light that would be received via the output optical path towards the N-faceted mirror corresponding to the input optical path.

14. The method of claim 13, in which, in providing the N-faceted mirror and the M-faceted mirror, the facets of each of the faceted mirrors corresponding to one of the sets of the optical paths are angled to reflect light towards a different one of the faceted mirrors corresponding to the other of the sets of the optical paths.

15. The method of claim 13, in which:
the input optical path is a first input optical path;
the method is additionally for changing the input optical path via which the optical signal is received from the first input optical path to a second input optical path, the second input optical path being one of the input optical paths different from the first input optical path; and
the method additionally comprises:
linearly stepping the N-faceted mirror corresponding to the second input optical path to align one of the facets thereof with the second input optical path, the one of the facets aligned with the second input optical path being angled to reflect the optical signal towards the M-faceted mirror corresponding to the output optical path, and
linearly stepping the M-faceted mirror corresponding to the output optical path to align a different one of the facets thereof with the output optical path, the different one of the facets aligned with the output optical path being angled to reflect light that would be received via the output optical path towards the N-faceted mirror corresponding to the second input optical path.

16. The method of claim 13, in which:
the output optical path is a first output optical path;
the method is additionally for changing the output optical path to which the optical signal is switched from the first output optical path to a second output optical path, the second output optical path being one of the output optical paths different from the first output optical path;
the method additionally comprises:
linearly stepping the N-faceted mirror corresponding to the input optical path to align a different one of the facets thereof with the input optical path, the different one of the facets aligned with the input optical path being angled to reflect the optical signal towards the M-faceted mirror corresponding to the second output optical path; and
linearly stepping the M-faceted mirror corresponding to the second output optical path to align one of the facets thereof with the second output optical path, the one of the facets aligned with the second output optical path being angled to reflect light that would be received via the second output optical path towards the N-faceted mirror corresponding to the input optical path.

17. The method of claim 13, in which:
the method additionally comprises:
providing a common mirror, and
locating the common mirror between the array of input optical paths and the array of output optical paths, facing the faceted mirrors; and
in providing the N-faceted mirror and the M-faceted mirror, the facets of each of the faceted mirrors corresponding to one of the sets of the optical paths are angled to reflect light to be incident on the common mirror at angles of incidence at which the common mirror reflects the light towards a different one of the faceted mirrors corresponding to the other of the sets of the optical paths.

* * * * *